United States Patent
Yang et al.

(10) Patent No.: US 9,768,720 B2
(45) Date of Patent: Sep. 19, 2017

(54) METHOD AND SYSTEM FOR ESTIMATING OPERATION PARAMETERS OF A SERVOMOTOR

(71) Applicants: LITE-ON ELECTRONICS (GUANGZHOU) LIMITED, Guangzhou (CN); LITE-ON TECHNOLOGY CORP., Taipei (TW)

(72) Inventors: Sheng-Ming Yang, New Taipei (TW); Kuang-Wei Lin, New Taipei (TW)

(73) Assignees: Lite-On Electronics (Guangzhou) Limited, Guangzhou (CN); Lite-On Technology Corp., Taipei (TW)

( * ) Notice: Subject to any disclaimer, the term of this patent is extended or adjusted under 35 U.S.C. 154(b) by 0 days.

(21) Appl. No.: 15/234,165

(22) Filed: Aug. 11, 2016

(65) Prior Publication Data

US 2017/0045870 A1    Feb. 16, 2017

(30) Foreign Application Priority Data

Aug. 14, 2015 (CN) .......................... 2015 1 0500888

(51) Int. Cl.
| | |
|---|---|
| H02P 7/00 | (2016.01) |
| H02P 23/14 | (2006.01) |
| G05B 19/416 | (2006.01) |
| H02P 21/14 | (2016.01) |
| H02P 21/20 | (2016.01) |

(52) U.S. Cl.
CPC .......... *H02P 23/14* (2013.01); *G05B 19/416* (2013.01); *H02P 21/14* (2013.01); *H02P 21/143* (2013.01); *H02P 21/20* (2016.02); *G05B 2219/34015* (2013.01); *G05B 2219/50185* (2013.01)

(58) Field of Classification Search
CPC .. H02P 6/20; H02P 23/14; H02P 21/22; H02P 27/08; H02P 6/28; H02P 1/46; H02P 21/06; H02P 21/143; H02P 21/18; H02P 21/20; H02P 21/24; H02P 21/34; H02P 2203/01; H02P 29/0016; H02P 6/182
USPC ............ 318/569, 568.2, 400.02, 400.34, 432
See application file for complete search history.

(56) References Cited

U.S. PATENT DOCUMENTS

| | | | | |
|---|---|---|---|---|
| 6,940,251 B1* | 9/2005 | Sarlioglu | ................ | H02P 21/28 318/400.34 |
| 7,088,077 B2* | 8/2006 | Nagashima | ......... | H02P 21/0089 318/432 |
| 7,211,984 B2* | 5/2007 | Patel | ....................... | F02N 11/04 318/700 |
| 7,339,344 B2* | 3/2008 | Borisavljevic | ............ | H02P 6/20 318/719 |
| 7,405,531 B2* | 7/2008 | Khatib | ................... | B25J 9/1633 318/568.11 |
| 7,860,624 B2* | 12/2010 | Kubota | ................ | B62D 5/0463 180/443 |

(Continued)

*Primary Examiner* — Paul Ip
(74) *Attorney, Agent, or Firm* — Rosenberg, Klein & Lee (57) ABSTRACT

A method for estimating operation parameters of a servomotor is described. The method includes the steps of: driving the servomotor to rotate stably at an initial angular velocity; computing d- and q-axis components of an initial voltage when the servomotor rotates at the initial angular velocity; accelerating the servomotor to a predetermined angular velocity according to the initial voltage; and computing at least one operation parameter of the servomotor after the servomotor rotates at the predetermined angular velocity.

16 Claims, 6 Drawing Sheets

(56) References Cited

U.S. PATENT DOCUMENTS

| | | | | |
|---|---|---|---|---|
| 7,986,118 B2* | 7/2011 | Yoshikawa | ............ | G05B 19/40 318/432 |
| 8,207,701 B2* | 6/2012 | Tang | ............ | G01D 21/00 318/808 |
| 8,232,758 B2* | 7/2012 | Okita | ............ | G05B 19/404 180/446 |
| 8,519,649 B2* | 8/2013 | Taniguchi | ............ | H02P 6/182 318/400.01 |
| 8,860,355 B2* | 10/2014 | Ueda | ............ | B30B 15/14 318/560 |
| 8,872,463 B2* | 10/2014 | Sonoda | ............ | H02P 23/14 318/560 |
| 2005/0137739 A1* | 6/2005 | Yoshida | ............ | G05B 19/404 700/170 |
| 2006/0069481 A1* | 3/2006 | Kubota | ............ | B62D 5/0463 701/41 |
| 2006/0097688 A1* | 5/2006 | Patel | ............ | F02N 11/04 318/778 |
| 2006/0250101 A1* | 11/2006 | Khatib | ............ | B25J 9/1633 318/568.2 |
| 2008/0067960 A1* | 3/2008 | Maeda | ............ | B62D 5/046 318/400.02 |
| 2008/0258670 A1* | 10/2008 | Yoshikawa | ............ | G05B 19/40 318/568.22 |
| 2010/0000815 A1* | 1/2010 | Tang | ............ | G01D 21/00 180/65.285 |
| 2011/0050146 A1* | 3/2011 | Okita | ............ | G05B 19/404 318/631 |
| 2011/0285337 A1* | 11/2011 | Taniguchi | ............ | H02P 6/182 318/400.34 |
| 2013/0026963 A1* | 1/2013 | Sonoda | ............ | H02P 23/14 318/561 |
| 2013/0063068 A1* | 3/2013 | Ueda | ............ | B30B 15/14 318/689 |
| 2014/0265952 A1* | 9/2014 | Katariya | ............ | H02P 21/0003 318/400.02 |
| 2014/0368137 A1* | 12/2014 | Taniguchi | ............ | B60L 11/14 318/400.04 |

\* cited by examiner

METHOD AND SYSTEM FOR ESTIMATING OPERATION PARAMETERS OF A SERVOMOTOR

CROSS-REFERENCE TO RELATED APPLICATION

This application claims priority of Chinese Patent Application No. 201510500888.X, filed on Aug. 14, 2015.

FIELD

The disclosure relates to a method and a system for estimating operation parameters of a servomotor, and more particularly to a method and a system for estimating a torque constant, inertia and a friction coefficient of the servomotor.

BACKGROUND

Servomotor systems are widely used in industries, and a reliable automatic control method of the servomotor system is needed, such that manpower cost may be reduced and productivity may be increased.

However, differently structured servomotors require different operation parameters (e.g., a torque constant, inertia and a friction coefficient) for control thereof.

SUMMARY

Therefore, an object of the disclosure is to provide a method and a system for rapidly estimating operation parameters of a servomotor.

According to an aspect of the disclosure, the method for estimating operation parameters of a servomotor is described. The method is to be implemented by a system that includes a current control loop for outputting an output current to the servomotor, and a control module for controlling the current control loop. The method includes the following steps:

a) outputting, by the control module, a current signal to the current control loop to enable the current control loop to output the output current to the servomotor;

b) driving, by the current control loop, the servomotor to rotate stably at an initial angular velocity by limiting integrated value of a difference between a current value of the current signal and a current value of the output current;

c) computing, by the control module, d- and q-axis components of an initial voltage when the servomotor rotates at the initial angular velocity;

d) outputting, by the control module, the initial voltage having the d- and q-axis components to the current control loop for accelerating the servomotor from the initial angular velocity to a predetermined angular velocity by feed-forward control; and e) after the servomotor rotates at the predetermined angular velocity, computing, by the control module, at least one operation parameter of the servomotor.

According to another aspect of the disclosure, the system for estimating operation parameters of a servomotor includes a current control loop and a control module.

The current control loop is configured to output an output current to the servomotor.

The control module is configured to control the current control loop, and is operable to:

output a current signal to the current control loop to enable the current control loop to output the output current to the servomotor and to drive the servomotor to rotate stably at an initial angular velocity by limiting integrated value of a difference between a current value of the current signal and a current value of the output current;

compute d- and q-axis components of an initial voltage when the servomotor rotates at the initial angular velocity;

output the d- and q-axis components of the initial voltage to the current control loop for accelerating the servomotor from the initial angular velocity to a predetermined angular velocity by feed-forward control; and compute at least one operation parameter of the servomotor after the servomotor rotates at the predetermined angular velocity.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
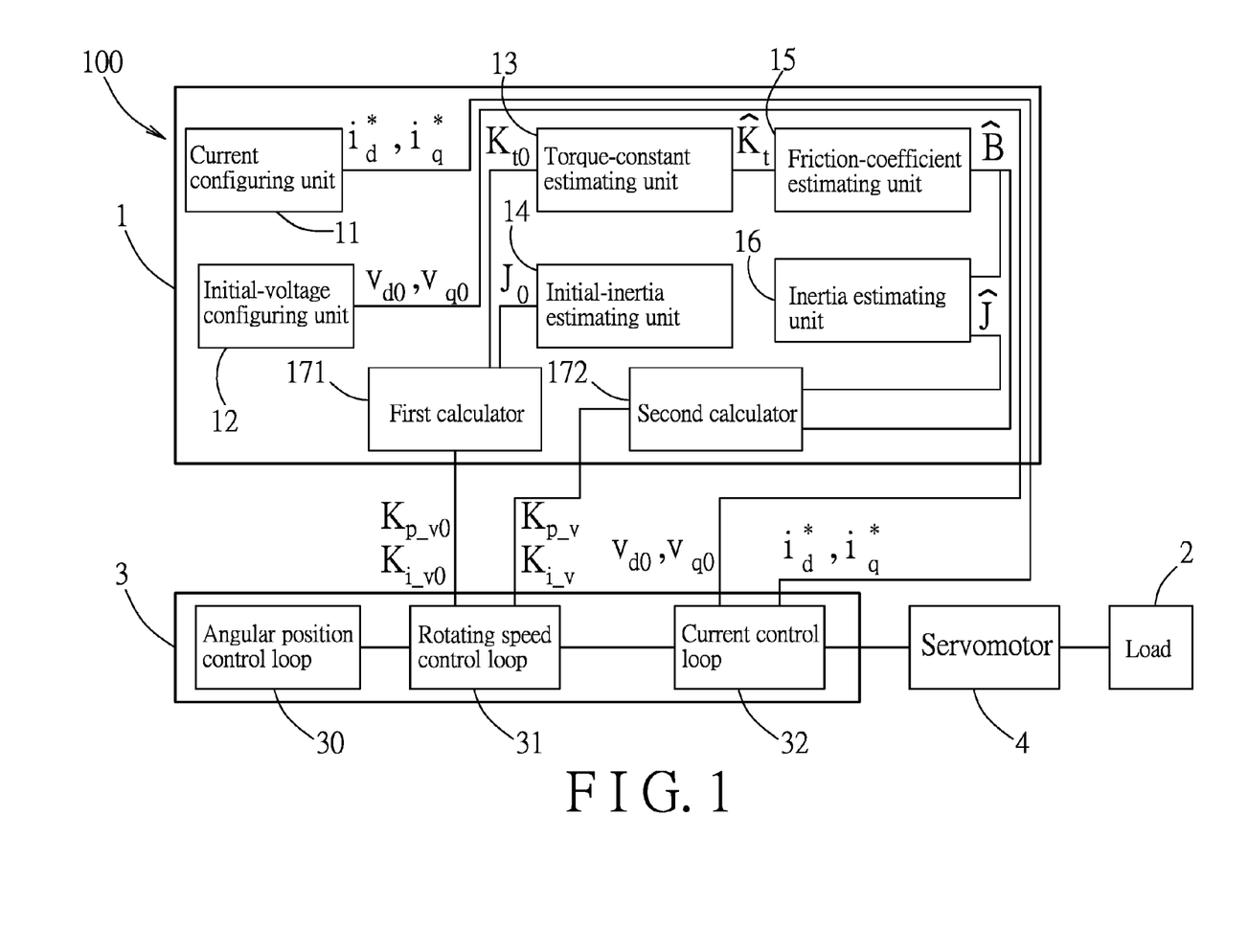
FIG. 1 is a block diagram illustrating an embodiment of system for estimating operation parameters of a servomotor according to the disclosure.

Referring to FIG. 1, an embodiment of a system 100 for estimating operation parameters of a servomotor 4 according to this disclosure is illustrated. The servomotor 4 is connected to a load 2, and the system 100 is configured to estimate the operation parameters of the servomotor 4 for controlling the servomotor 4 to stably drive the load 2. In this embodiment, the servomotor 4 is a permanent-magnet synchronous motor.

The system 100 includes a control loop module 3 and a control module 1.

The control loop module 3 includes a current control loop 32, a rotating speed control loop 31 and an angular position control loop 30. The current control loop 32 is configured to output an output current to the servomotor 4. The rotating speed control loop 31 is configured to drive the servomotor 4 according to an angular velocity signal. The angular position control loop 30 is configured to generate the angular velocity signal outputted to the rotating speed control loop 31.

The control module 1 is configured to control the current control loop 32 and the rotating speed control loop 31. In this embodiment, the control module 1 is a computer provided with a software and/or a firmware. The control module 1 is programmed to cooperate with the control loop module 3 to implement a method for estimating the operation parameters of the servomotor 4 according to this disclosure, so that the servomotor 4 loaded with the load 2 can be controlled, for example by the control loop module 3, according to the operation parameters.

Figure 5:
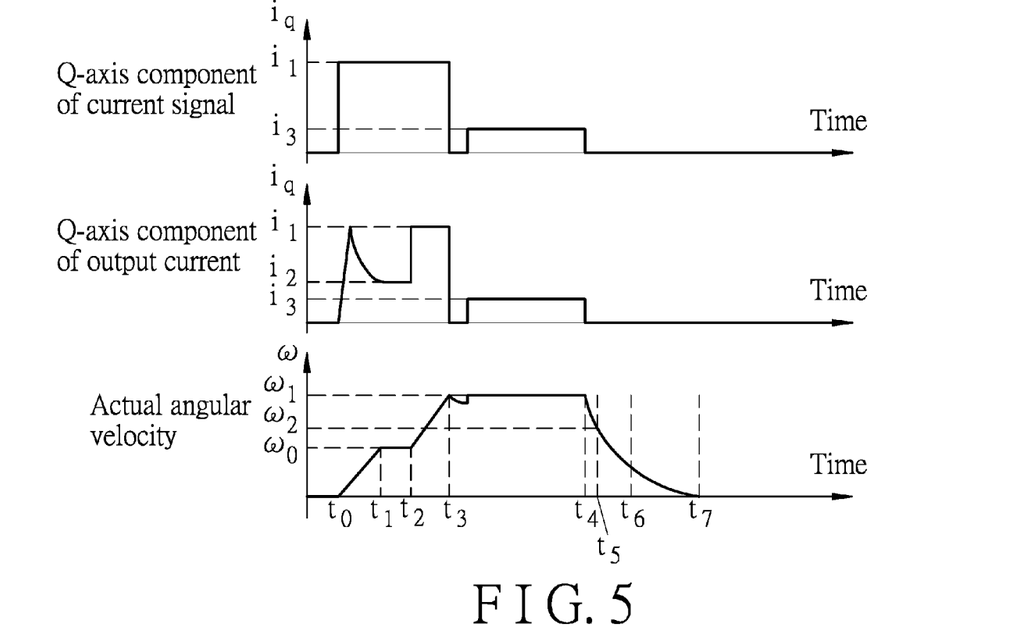
FIG. 5 is a timing diagram for illustrating timing waveforms of a current signal used to control the current control loop, an output current outputted to the servomotor, and an angular velocity of the servomotor.

Referring further to FIG. 5, in durations $t_0$-$t_7$, the system 100 is configured to compute the operation parameters, such as an estimated torque constant $\hat{K}_t$, an estimated inertia $\hat{J}$ and an estimated friction coefficient $\hat{B}$, of the servomotor 4 loaded with the load 2. By tuning the control loop module 3 with the operation parameters, the servomotor 4 can be controlled by the control loop module 3 to stably operate.

It should be noted that, for the sake of convenience of description, notation standard are briefly addressed herein. A symbol with a "*" represents a value of an instruction signal, e.g., ω* represents an angular velocity value of the angular velocity signal for instructing the rotating speed control loop 31. A symbol with a "^" represents an estimated quantity, e.g., $\hat{J}$ represents the estimated inertia. A symbol without any tag represents an actual physical quantity, e.g., J represents an actual inertia.

Figure 2:
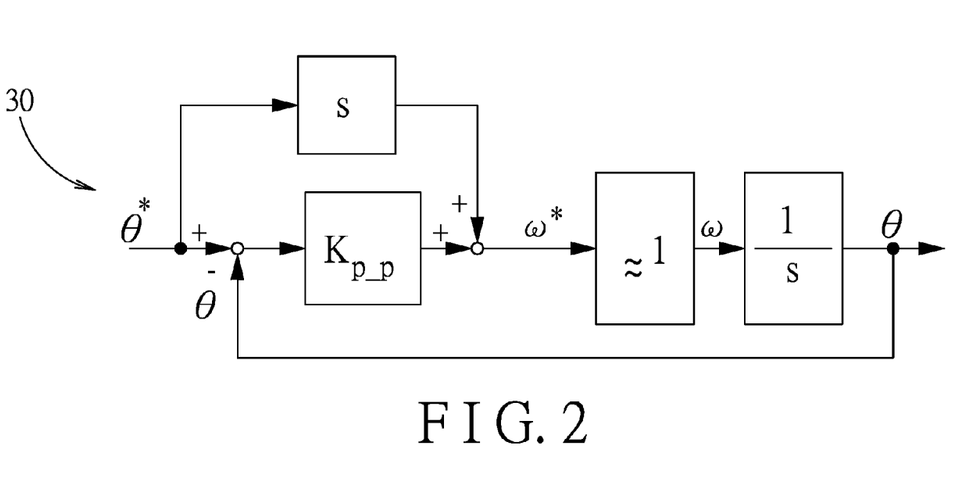
FIG. 2 is a block diagram illustrating an embodiment of an angular position control loop of the system according to the disclosure.
Figure 3:
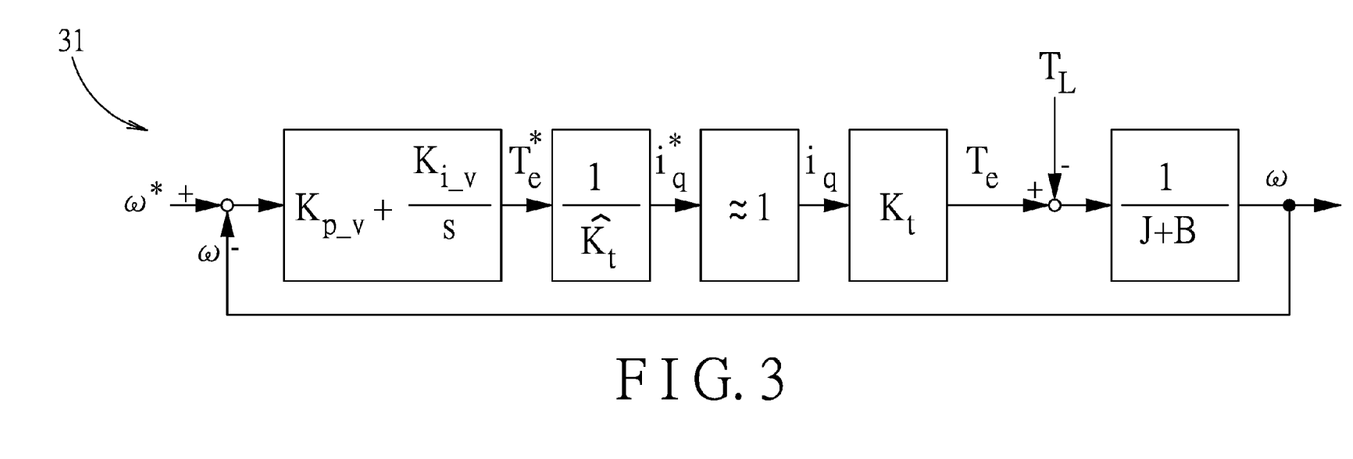
FIG. 3 is a block diagram illustrating an embodiment of a rotating speed control loop of the system according to the disclosure.
Figure 4:
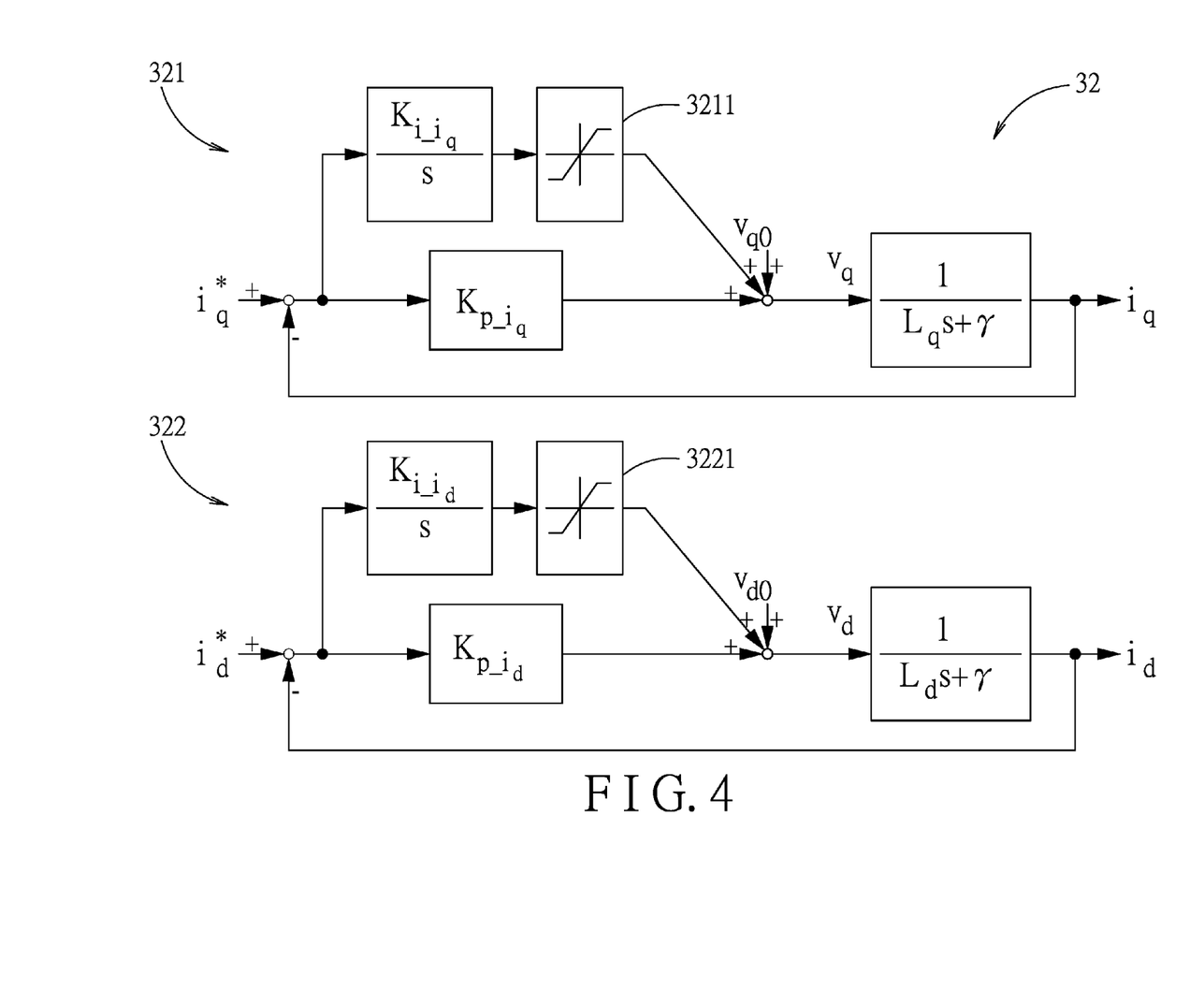
FIG. 4 is a block diagram illustrating an embodiment of a current control loop of the system according to the disclosure.

Block diagrams of the angular position control loop 30, the rotating speed control loop 31 and the current control loop 32 are illustrated in FIG. 2, FIG. 3 and FIG. 4, respectively.

Referring to FIG. 2, a transfer function of the angular position control loop 30 is, but is not limited to, $$\frac{\theta(s)}{\theta^*(s)} = \frac{K_{p\_p}}{s + K_{p\_p}},$$

where θ is an angle value of an angular position of the servomotor 4, θ* is an angle value of an angle signal for instructing the angular position control loop 30, $K_{p\_p}$ is a proportional gain of the angular position control loop 30 associated with a cutoff frequency and a bandwidth of the angular position control loop 30, and s is a complex frequency parameter.

Referring to FIG. 3, a transfer function of the rotating speed control loop 31 is, but is not limited to, $$\frac{\omega(s)}{\omega^*(s)} = \frac{\frac{K_{i\_v}}{B}}{s + \frac{K_{i\_v}}{B}} = \frac{\omega_v}{s + \omega_v},$$

where ω is an angular velocity value of an actual angular velocity of the servomotor 4, ω* is an angular velocity value of the angular velocity signal, $K_{i\_v}$ is an integral gain of the rotating speed control loop 31, B is an actual friction coefficient of the servomotor 4, and $\omega_v$ is a bandwidth of the rotating speed control loop 31 associated with the cutoff frequency.

In this embodiment, the rotating speed control loop 31 is implemented by a proportional integral controller (PI controller). The rotating speed control loop 31 computes a difference by subtracting the angular velocity value of the actual angular velocity ω of the servomotor 4 from the angular velocity value of the angular velocity signal ω*, which is generated by the angle control loop 30. Then, the rotating speed control loop 31 processes the difference with reference to the integral gain $K_{i\_v}$ and a proportional gain $K_{p\_v}$ of the rotating speed control loop 31 so as to obtain a torque value of a torque signal $T^*_e$. It should be noted that values of the integral gain $K_{i\_v}$ and the proportional gain $K_{p\_v}$ are to be solved herein. Next, the torque value of the torque signal $T^*_e$ is divided by the estimated torque constant $\hat{K}_t$ to obtain a current value of a current signal i*. In particular, the current signal is used to instruct the current control loop 32, and has a d-axis component $i^*_d$ and a q-axis component $i^*_q$. Referring to FIG. 4, the current control loop 32 includes a q-axis control loop 321 and a d-axis control loop 322. A transfer function of the q-axis control loop 321 is, but is not limited to, $$\frac{i_q(s)}{i^*_q(s)} = \frac{\frac{K_{p\_iq}}{L_q}}{s + \frac{K_{p\_iq}}{L_q}} = \frac{\omega_{iq}}{s + \omega_{iq}},$$

where $i_q$ is a q-axis component of the output current, $i^*_q$ is the q-axis component of the current signal, $K_{p\_iq}$ is a proportional gain of the q-axis control loop 321, $L_q$ is a q-axis inductance, and $\omega_{iq}$ is a bandwidth of the q-axis control loop 321. The d-axis control loop 322 has a transfer function similar to that of the q-axis control loop 322. As shown in FIG. 4, $i_d$ is a d-axis component of the output current, $i^*_d$ is the d-axis component of the current signal, $K_{p\_id}$ is a proportional gain of the d-axis control loop 322, $L_d$ is a d-axis inductance, and $\omega_{id}$ is a bandwidth of the d-axis control loop 322.

Referring to FIG. 4 in combination with FIG. 3, since an output of the current control loop 32 varies much faster than an output of the rotating speed control loop 31, in this embodiment, the transfer function of the q-axis control loop 321 of the current control loop 32 is approximated by one, which means that the q-axis component of the current signal $i^*_q$ is approximately equal to the q-axis component $i_q$ of the output current $$\left(\text{i.e., } \frac{i_q}{i^*_q} \approx 1\right).$$

It is known that an actual motor torque $T_e$ of the servomotor 4 is equal to the q-axis component $i_q$ of the output current multiplied by a torque constant $K_t$. The angular velocity value of the actual angular velocity ω of the servomotor 4 is derived from a difference between the actual motor torque $T_e$ of the servomotor 4 and an actual load torque $T_L$ of the load 2 with reference to the actual inertia J and an actual friction coefficient B.

As illustrated in FIG. 4, in the q-axis control loop 321, a difference between the q-axis component $i^*_q$ of the current signal and the q-axis component $i_q$ of the output current that is fedback to an input of the q-axis control loop 321 is processed with reference to the proportional gain $K_{p\_iq}$ and an integral gain $K_{i\_iq}$ of the q-axis control loop 321, and then combined with a q-axis component $v_{q0}$ of an initial voltage, so as to obtain a q-axis component $v_q$ of an output voltage outputted to the servomotor 4. Similarly, in the d-axis control loop 322, a difference between the d-axis component $i^*_d$ of the current signal and the d-axis component $i_d$ of the output current that is fedback to an input of the d-axis control loop 322 is processed with reference to the proportional gain $K_{p\_id}$ and an integral gain $K_{i\_id}$ of the d-axis control loop 322, and then combined with a d-axis component $v_{d0}$ of the initial voltage, so as to obtain a d-axis component $v_d$ of the output voltage.

Furthermore, for the current control loop 32 in this embodiment, integrated values of the differences between the q- and d-axis components $i^*_q$, $i^*_d$ of the current signal and the q- and d-axis components $i_q$, $i_d$ of the output current are limited by respective limiters 3211, 3221 so as to limit the integrated values in a reasonable range.

It is worth noting that the d-axis component $i^*_d$ is set as zero ($i^*_d$=0) in this embodiment. In other words, only the q-axis component $i^*_q$ of the current signal is considered in the following description, and the d-axis control loop 322 may be omitted in other embodiments.

Specifically, referring back to FIG. 1, the control module 1 includes a current configuring unit 11, an initial-voltage configuring unit 12, a torque-constant estimating unit 13, an initial-inertia estimating unit 14, a friction-coefficient estimating unit 15, an inertia estimating unit 16, a first calculator 171 and a second calculator 172.

At first, the current configuring unit 11 generates the q-axis component $i^*_q$ of the current signal for the current control loop 32, and the current control loop 32 drives the servomotor 4 to rotate stably at an initial angular velocity $\omega_0$ by limiting the integrated value of the difference between the current value of the current signal $i^*$ and a current value of the output current.

When the servomotor 4 rotates at the initial angular velocity $\omega_0$, the initial-voltage configuring unit 12 of the control module 1 computes the d-axis component $v_{d0}$ and the q-axis component $v_{q0}$ of the initial voltage, and outputs the d- and q-axis components $v_{d0}$, $v_{q0}$ of the initial voltage to the current control loop 32 for accelerating the servomotor 4 from the initial angular velocity $\omega_0$ to a predetermined angular velocity $\omega_1$ by feed-forward control and by relaxing the limitation of the integrated value. The control module 1 then computes at least one operation parameter of the servomotor 4 after the servomotor 4 rotates at the predetermined angular velocity $\omega_1$.

For example, when the servomotor 4 rotates at the predetermined angular velocity $\omega_1$, the torque-constant estimating unit 13 computes an initial estimated torque constant $\hat{K}_{t0}$. The initial-inertia estimating unit 14 computes an initial estimated inertia $\hat{J}_0$ with the q-axis component $i^*_q$ of the current signal equal to zero (i.e., $i^*_q$=0). The first calculator 171 computes an initial proportional gain $K_{p\_v0}$ and an initial integral gain $K_{i\_v0}$ of the rotating speed control loop 31 based upon the initial estimated torque constant $\hat{K}_{t0}$ and the initial estimated inertia $\hat{J}_0$, and then controls the rotating speed control loop 31 with the initial proportional gain $K_{p\_v0}$ and the initial integral gain $K_{i\_v0}$.

In addition, the control module 1 measures the q-axis component $i_q$ of the output current which corresponds to the predetermined angular velocity $\omega_1$. Based upon the predetermined angular velocity $\omega_1$ and the q-axis component $i_q$ of the output current, the torque-constant estimating unit 13 computes the estimated torque constant $\hat{K}_t$, and the friction-coefficient estimating unit 15 computes the estimated friction coefficient $\hat{B}$. Furthermore, the inertia estimating unit 16 computes the estimated inertia $\hat{J}$ using curve fitting based upon a plurality of angular velocity values and the estimated friction coefficient $\hat{B}$.

Finally, the second calculator 172 computes a proportional gain $K_{p\_v}$ and an integral gain $K_{i\_v}$ for controlling the rotating speed control loop 31 based upon the estimated torque constant $\hat{K}_t$ and the estimated friction coefficient $\hat{B}$.

Referring to FIGS. 1 and 5-7, the method implemented by the system 100 for estimating the operation parameters of the servomotor 4 has the following steps. It should be noted again that the d-axis component $i^*_d$ of the current signal is set as zero ($i^*_d$=0) throughout the procedure of this embodiment.

Figure 7:
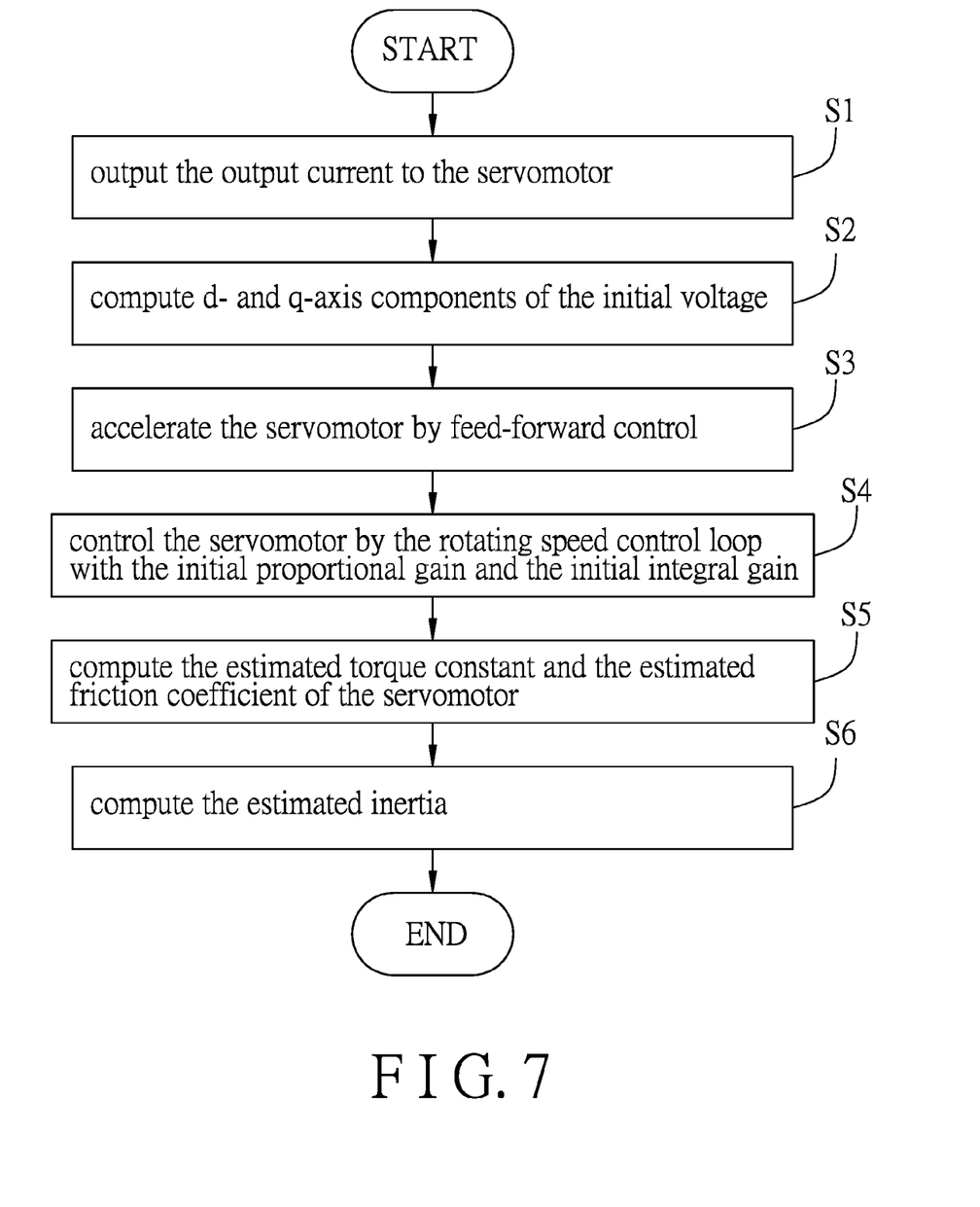
FIG. 7 is a flow chart of a method for estimating the operation parameters of the servomotor according to the disclosure.

In duration $t_0$-$t_1$ (step S1), the current configuring unit 11 of the control module 1 outputs the q-axis component $i^*_q$ of the current signal to the current control loop 32 to enable the current control loop 32 to output the q-axis component $i_q$ of the output current to the servomotor 4. In step S1, the q-axis component $i^*_q$ of the current signal is equal to $i_1$ ($i^*_q$=$i_1$).

The current control loop 32 drives the servomotor 4 to rotate stably at the initial angular velocity $\omega_0$ by limiting the integrated value of the difference between the q-axis component $i^*_q$ of the current signal and the q-axis component $i_q$ of the output current. When the servomotor 4 reaches the initial angular velocity $\omega_0$ at instant $t_1$, the q-axis component $i_q$ of the output current is equal to $i_2$ ($i_q$=$i_2$).

In duration $t_1$-$t_2$ (step S2), the initial-voltage configuring unit 12 computes d- and q-axis components $v_{d0}$ and $v_{q0}$ of the initial voltage when the servomotor 4 rotates at the initial angular velocity $\omega_0$. The d- and q-axis components $v_{d0}$ and $v_{q0}$ of the initial voltage is computed based upon:

$$v_{d0} = -\omega_0 \times P \times L_q \times i_q, \text{ and}$$

$$v_{q0} = \omega_0 \times P \times L_d \times i_d + \omega_0 \times P \times \lambda,$$

where $L_d$ and $L_q$ are respectively d- and q-axis components of inductance, P are pole pair of servomotor, and $\lambda$ is a physical quantity of flux linkage. Reference may be made to *"Permanent Magnet Synchronous and Brushless DC Motor Drives,"* 2010 (Ch. 3, pages 227-233) for calculation of the physical quantity of the flux linkage.

In duration $t_2$-$t_3$ (step S3), the initial-voltage configuring unit 12 outputs the initial voltage having the d- and q-axis components $v_{d0}$ and $v_{q0}$ to the current control loop 32, so that the servomotor 4 is accelerated by feed-forward control. As a result, the q-axis component $i_q$ of the output current follows the q-axis component $i^*_q$ of the current signal. When the q-axis component $i_q$ of the output current reaches the q-axis component $i^*_q$ of the current signal, the control module 1 commands the current control loop 32 to relax the limitation of the integrated value, so as to accelerate the servomotor 4 to achieve the predetermined angular velocity $\omega_1$ at instant $t_3$.

In duration $t_3$-$t_4$ (step S4), the servomotor 4 stably rotates at the predetermined angular velocity $\omega_1$, and the torque-constant estimating unit 13 computes the initial estimated torque constant $\hat{K}_{t0}$ based upon $$\hat{K}_{t0} = \frac{3}{2} \cdot \frac{v_q}{\omega},$$

where $\omega$ is the angular velocity value of the actual angular velocity of the servomotor 4. In the following, the initial-inertia estimating unit 14 computes the initial estimated inertia $\hat{J}_0$ based upon $$\hat{J}_0 = \frac{\hat{K}_{t0} \times i_1}{\alpha},$$

where α is a current angular acceleration of the servomotor 4 accelerating from the initial angular velocity $\omega_0$ to the predetermined angular velocity $\omega_1$, and $i_1$ is the value at which the q-axis component $i^*_q$ of the current signal is set ($i^*_q=i_1$). Next, the current configuring unit 11 outputs to the current control loop 32 the current signal with the q-axis component $i^*_q$ equal to zero ($i^*_q=0$), so that the rotating speed control loop 31 takes over the controlling of the servomotor 4 from the current control loop 32.

Then, the first calculator 171 computes the initial proportional gain $K_{p\_v0}$ based upon $K_{p\_v0}=2\cdot\omega_v\cdot J_0$ and the initial integral gain $K_{i\_v0}$ based upon $K_{i\_v0}=\omega_v^2\cdot J_0$. Following the computation of the initial proportional gain $K_{p\_v0}$ and the initial integral gain $K_{i\_v0}$, the control module 1 controls the rotating speed control loop 31 with the initial proportional gain $K_{p\_v0}$ and the initial integral gain $K_{i\_v0}$. It is worth noting that in FIG. 5, the angular velocity value of the actual angular velocity ω of the servomotor 4 decreases slightly at the beginning of the duration $t_3$-$t_4$. The decrease of the angular velocity value of the actual angular velocity ω is attributed to the q-axis component $i^*_q$ of the current signal being forced to zero ($i^*_q=0$) when the rotating speed control loop 31 takes over control of the servomotor 4 from the current control loop 32. However, the angular velocity value of the actual angular velocity ω recovers eventually to the predetermined angular velocity $\omega_1$ after the rotating speed control loop 31 controls the servomotor 4 with the initial proportional gain $K_{p\_v0}$ and the initial integral gain $K_{i\_v0}$.

Furthermore, at the end of the duration $t_3$-$t_4$ (step S5), the torque-constant estimating unit 13 computes the estimated torque constant $\hat{K}_t$ of the servomotor 4 based upon $$\hat{K}_t = 1.5 \times \frac{v_q - i_3 \cdot r_s}{\omega_1},$$

and the friction-coefficient estimating unit 15 computes the estimated friction coefficient $\hat{B}$ of the servomotor 4 based upon $$\hat{B} = \frac{\hat{K}_t \cdot i_3}{\omega_1},$$

where $r_s$ is a resistance value of the servomotor 4, and $i_3$ is the q-axis component $i_q$ of the output current measured when the servomotor rotates 4 at the predetermined angular velocity $\omega_1$ in the duration $t_3$-$t_4$.

Figure 6:
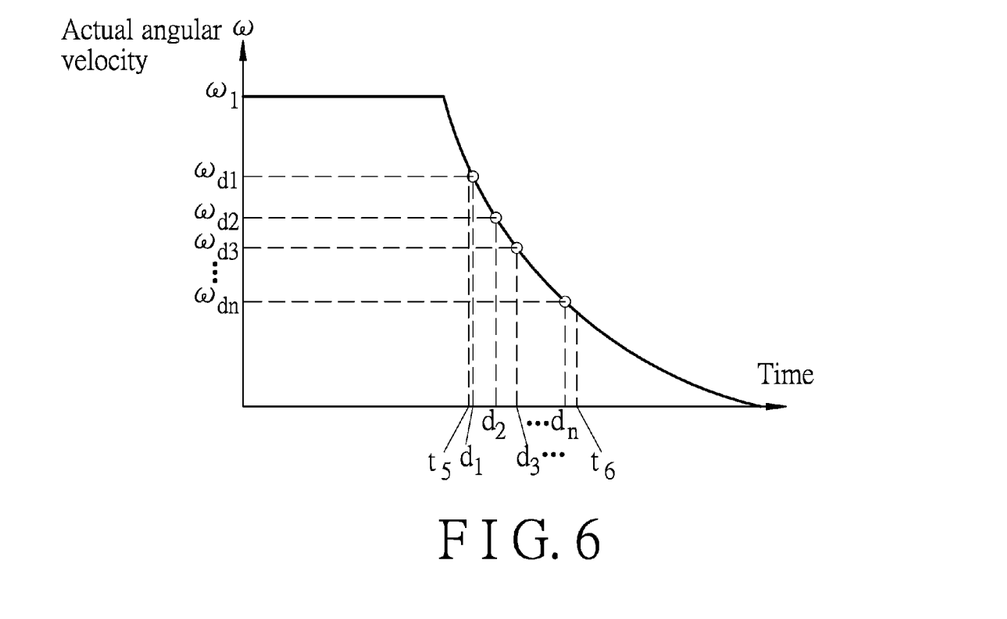
FIG. 6 is an enlarged plot for illustrating the timing waveform of the angular velocity.

Finally, in duration $t_4$-$t_7$ (step S6), the control module 1 deactivates the servomotor 4 so as to make the servomotor 4 decelerate for computing the estimated inertia $\hat{J}$. Referring to FIG. 6, when the servomotor 4 decelerates to an angular velocity value $\omega_2$ between $\omega_1$ and $\omega_0$, the inertia estimating unit 16 samples a plurality of angular velocity values $\omega_{d1}$ to $\omega_{dn}$ during deceleration of the servomotor 4, i.e., in duration $t_5$-$t_6$, and computes the estimated inertia $\hat{J}$ using curve fitting.

Specifically, the estimated inertia $\hat{J}$ is computed based upon $$\hat{J} = \frac{\hat{B}}{N},$$

where N is a constant associated with time solved by the curve fitting with an exponential function $\omega(t)=M\cdot e^{N\cdot t}$, and M is a constant associated with the angular velocity of the servomotor 4 solved by the curve fitting with the exponential function.

Subsequently, the second calculator 172 computes the proportional gain based upon $K_{p\_v}=\omega_v\cdot\hat{J}$ and the integral gain based upon $K_{i\_v}=\omega_v\cdot\hat{B}$, and controls the rotating speed control loop 31 with the proportional gain $K_{p\_v}$ and the integral gain $K_{i\_v}$. Therefore, the rotating speed control loop 31 is capable of controlling the servomotor 4 to stably operate.

Figure 8:
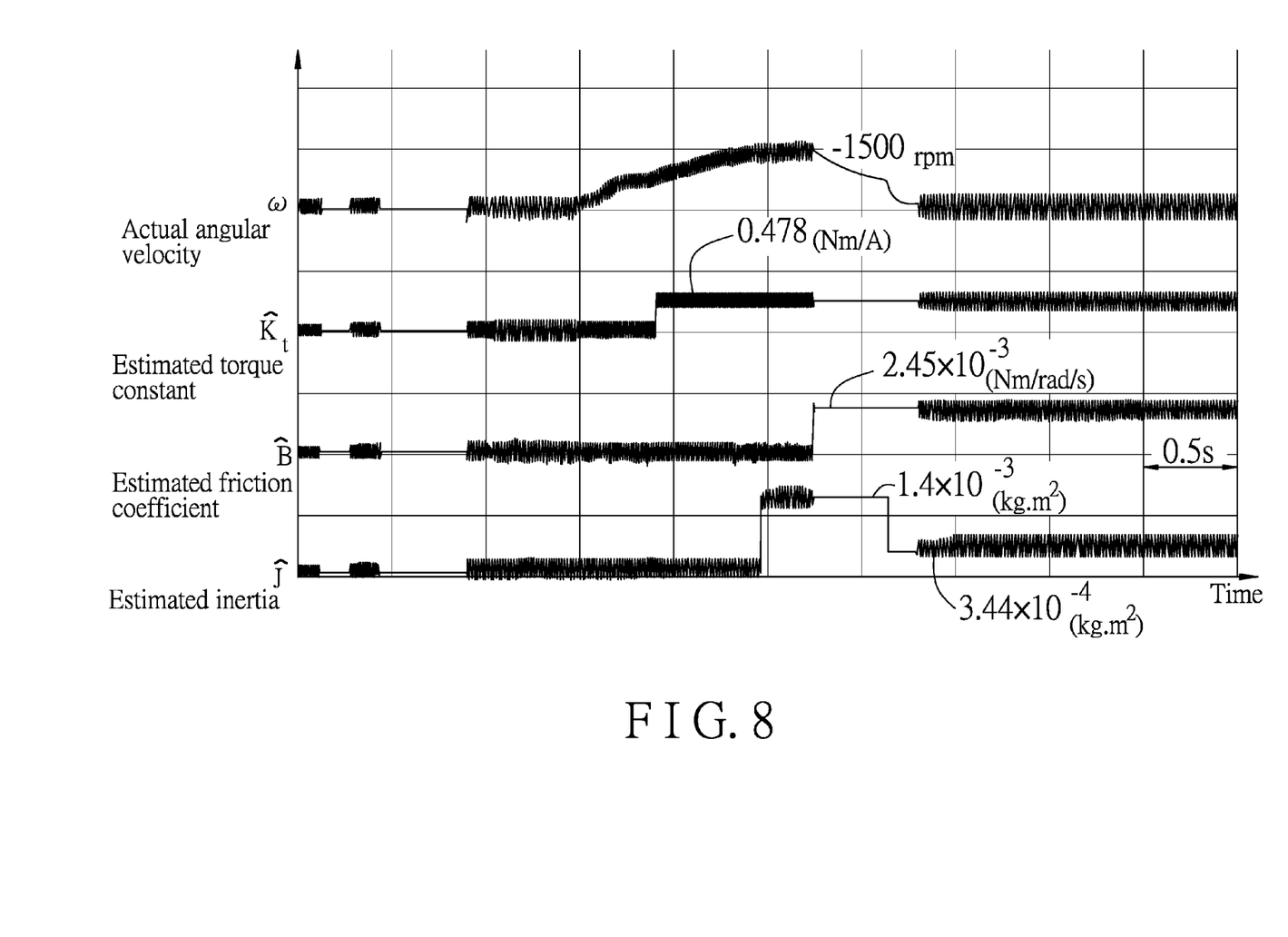
FIG. 8 is a plot for illustrating a result of an experiment according to another embodiment for computing an estimated torque constant, an estimated friction coefficient and an estimated inertia based upon the angular velocity.

Referring to FIG. 8, a result of an experiment according to another embodiment is illustrated. The result shows that, by the method of this disclosure, the estimated torque constant is computed as $$\hat{K}_t = 4.78 \times 10^{-1} \left(\frac{\text{N}\cdot\text{m}}{\text{A}}\right)$$

during acceleration of the servomotor 4, the initial estimated inertia is computed as $\hat{J}_0=1.4\times10^{-3}$ (kg·m$^2$) when the servomotor 4 rotates substantially at 1500 rpm, the estimated friction coefficient is computed as $$\hat{B} = 2.45 \times 10^{-3} \left(\frac{\text{N}\cdot\text{m}}{\text{rad/sec}}\right)$$

during deceleration of the servomotor 4, and the estimated inertia is computed as $\hat{J}=3.44\times10^{-4}$ (kg·m$^2$) before the servomotor 4 comes to a stop. The duration for estimating the operation parameters by the method of this disclosure is only about 1.4 seconds.

Referring to Table 1 below, an error between each of the operation parameters estimated by the method of this disclosure and manual setting value is shown. The error of the estimated inertia $\hat{J}$ is 5.0%. The error of the estimated friction coefficient $\hat{B}$ is roughly 5.1%. The error of the estimated torque constant $\hat{K}_t$ is roughly 1.5%.

TABLE 1

|  | Manual setting value | Estimation | Error |
| --- | --- | --- | --- |
| Inertia (kg · m$^2$) | $3.28 \times 10^{-4}$ | $3.44 \times 10^4$ | 5.0% |
| Friction coefficient $\left(\frac{\text{N}\cdot\text{m}}{\text{rad/sec}}\right)$ | $2.33 \times 10^{-3}$ | $2.45 \times 10^{-3}$ | 5.1% |
| Torque constant $\left(\frac{\text{N}\cdot\text{m}}{\text{A}}\right)$ | $4.86 \times 10^{-1}$ | $4.78 \times 10^{-1}$ | 1.5% |

By the method of this disclosure, the system 100 is capable of estimating the operation parameters of the servomotor 4 and computing the proportional gain $K_{p\_v}$ and the integral gain $K_{i\_v}$ according to the operation parameters for automatically controlling the servomotor 4 within about 1.4 seconds.

To sum up, by limiting the integrated value of the difference between the current value of the current signal i* and the current value of the output current, operation errors of the servomotor 4 are reduced so that the servomotor 4 controlled by the system 100 is capable of stable operation. Moreover, by the method of this disclosure, the operation parameters, such as the estimated inertia $\hat{J}$, the estimated friction coefficient $\hat{B}$ and the estimated torque constant $\hat{K}_t$, are automatically, precisely and rapidly computed during operation of the servomotor 4. So-called dynamic performance, i.e. automatically and rapidly tuning the operation parameters for control of the servomotor 4, is achieved.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A method for estimating operation parameters of a servomotor, the method to be implemented by a system that includes a current control loop for outputting an output current to the servomotor, and a control module for controlling the current control loop, the method comprising the steps of:
   a) outputting, by the control module, a current signal to the current control loop to enable the current control loop to output the output current to the servomotor;
   b) driving, by the current control loop, the servomotor to rotate stably at an initial angular velocity by limiting integrated value of a difference between a current value of the current signal and a current value of the output current;
   c) computing, by the control module, d- and q-axis components of an initial voltage when the servomotor rotates at the initial angular velocity;
   d) outputting, by the control module, the initial voltage having the d- and q-axis components to the current control loop for accelerating the servomotor from the initial angular velocity to a predetermined angular velocity by feed-forward control; and
   e) after the servomotor rotates at the predetermined angular velocity, computing, by the control module, at least one operation parameter of the servomotor.

2. The method of claim 1, the system further including a rotating speed control loop that is controlled by the control module to drive the servomotor according to an angular velocity signal,
   wherein, in step c), the control module is configured to compute the d- and q-axis components of the initial voltage based upon:

$$v_{d0} = -\omega_0 \times P \times L_q \times i_q, \text{ and}$$

$$v_{q0} = \omega_0 \times P \times L_d \times i_d + \omega_0 \times P \times \lambda,$$

where $v_{d0}$ and $v_{q0}$ are respectively the d- and q-axis components of the initial voltage, $L_d$ and $L_q$ are respectively d- and q-axis components of inductance, $\omega_0$ is the initial angular velocity, P are pole pair of servomotor, $i_d$ and $i_q$ are respectively d- and q-axis components of the output current, and $\lambda$ is a physical quantity of flux linkage;
   wherein, in step d), the control module outputs the initial voltage to the current control loop, so that the q-axis component of the output current follows a q-axis component of the current signal.

3. The method of claim 2, wherein:
   in step d), when the q-axis component of the output current reaches the q-axis component of the current signal, the control module commands the current control loop to relax the limitation of the integrated value, so as to accelerate the servomotor to achieve the predetermined angular velocity;
   in step e), the control module computes an estimated friction coefficient when the servomotor rotates at the predetermined angular velocity.

4. The method of claim 3, wherein step e) includes the sub-steps of:
   when the servomotor rotates at the predetermined angular velocity $\omega_1$, computing an initial estimated torque constant based upon $$\hat{K}_{t0} = \frac{3}{2} \cdot \frac{v_q}{\omega},$$

where $v_q$ is a q-axis component of an output voltage outputted to the servomotor, and $\omega$ is an actual angular velocity of the servomotor;
   outputting to the current control loop the current signal with the q-axis component thereof equal to zero, and computing an initial estimated inertia based upon $$\hat{J}_0 = \frac{\hat{K}_{t0} \times i_1}{\alpha},$$

where $\alpha$ is a current angular acceleration of the servomotor, and $i_1$ is a value at which the q-axis component of the current signal is set;
   computing an initial proportional gain based upon $K_{p\_v0} = 2 \cdot \omega_v \cdot \hat{J}_0$ and an initial integral gain based upon $K_{i\_v0} = \omega_v^2 \cdot \hat{J}_0$; and
   controlling the rotating speed control loop with the initial proportional gain $K_{p\_v0}$ and the initial integral gain $K_{i\_v0}$.

5. The method of claim 4, wherein step e) further includes the sub-steps of:
   deactivating the servomotor so as to make the servomotor decelerate;
   sampling a plurality of angular velocity values during deceleration of the servomotor; and
   computing an estimated inertia using curve fitting based on the angular velocity values and the estimated friction coefficient.

6. The method of claim 5, wherein, in step e), the control module is configured to compute an estimated torque constant $\hat{K}_t$ based upon $$\hat{K}_t = 1.5 \times \frac{v_q - i_3 \cdot r_s}{\omega_1}$$

and the estimated friction coefficient $\hat{B}$ based upon $$\hat{B} = \frac{\hat{K}_t \cdot i_3}{\omega_1}$$

when the servomotor rotates at the predetermined angular velocity, where $r_s$ is a resistance value of the servomotor, and $i_3$ is a q-axis component of the output current corresponding to the predetermined angular velocity $\omega_1$;

wherein the control module is configured to compute the estimated inertia $\hat{J}$ based upon $$\hat{J} = \frac{\hat{B}}{N},$$

where N is a constant associated with time solved by the curve fitting with an exponential function $\omega(t) = M \cdot e^{N \cdot t}$, and M is a constant associated with the angular velocity of the servomotor solved by the curve fitting with the exponential function.

7. The method of claim 6, further comprising the steps of computing a proportional gain based upon $K_{p\_v} = \omega_v \cdot \hat{J}$ and an integral gain based upon $K_{i\_v} = \omega_v \cdot \hat{B}$, and controlling the rotating speed control loop with the proportional gain $K_{p\_v}$ and the integral gain $K_{i\_v}$.

8. A system for estimating operation parameters of a servomotor, the system comprising:
a current control loop configured to output an output current to the servomotor; and
a control module configured to control said current control loop, and being operable to
output a current signal to said current control loop to enable said current control loop to output the output current to the servomotor and to drive the servomotor to rotate stably at an initial angular velocity by limiting integrated value of a difference between a current value of the current signal and a current value of the output current,
compute d- and q-axis components of an initial voltage when the servomotor rotates at the initial angular velocity,
output the d- and q-axis components of the initial voltage to said current control loop for accelerating the servomotor from the initial angular velocity to a predetermined angular velocity by feed-forward control, and
compute at least one operation parameter of the servomotor after the servomotor rotates at the predetermined angular velocity.

9. The system of claim 8, further comprising a rotating speed control loop configured to be controlled by said control module to drive the servomotor according to rotating speed of the servomotor,
wherein said control module is configured to compute the d- and q-axis components of the initial voltage based upon:

$v_{d0} = -\omega_0 \times P \times L_q \times i_q$, and $v_{q0} = \omega_0 \times P \times L_d \times i_d + \omega_0 \times P \times \lambda$, where $v_{d0}$ and $v_{q0}$ are respectively the d- and q-axis components of the initial voltage, $L_d$ and $L_q$ are respectively d- and q-axis components of inductance, $\omega_0$ is the initial angular velocity, P are pole pair of servomotor, $i_d$ and $i_q$ are respectively d- and q-axis components of the output current, and $\lambda$ is a physical quantity of flux linkage;
wherein said current control loop is configured to output the output current having the q-axis component that follows a q-axis component of the current signal.

10. The system of claim 9, wherein said control module includes a friction-coefficient estimating unit configured to:
when the q-axis component of the output current reaches the q-axis component of the current signal, command said current control loop to relax the limitation of the integrated value, so as to accelerate the servomotor to achieve the predetermined angular velocity; and
compute an estimated friction coefficient when the servomotor rotates at the predetermined angular velocity.

11. The system of claim 10, wherein said control module includes:
a current configuring unit configured to output to said current control loop the current signal with the q-axis component equal to 0;
a torque-constant estimating unit configured to compute an initial estimated torque constant when the servomotor rotates at the predetermined angular velocity;
an initial-inertia estimating unit configured to compute an initial inertia based on the initial estimated torque constant when the servomotor rotates at the predetermined angular velocity; and
a calculator configured to compute an initial proportional gain and an initial integral gain based on the initial inertia, and to control said rotating speed control loop with the initial proportional gain and the initial integral gain.

12. The system of claim 11, wherein:
said torque-constant estimating unit is configured to compute the initial estimated torque constant based upon $$\hat{K}_{t0} = \frac{3}{2} \cdot \frac{v_q}{\omega},$$

where $v_q$ is a q-axis component of an output voltage outputted to the servomotor, and $\omega$ is a current angular velocity of the servomotor;
said initial-inertia estimating unit is configured to compute the initial inertia based upon $$\hat{J}_0 = \frac{\hat{K}_{t0} \times i_1}{\alpha},$$

where $\alpha$ is a current angular acceleration of the servomotor, and $i_1$ is a value at which the q-axis component of the current signal is set; and
said calculator is configured to compute the initial proportional gain based upon $K_{p\_v0} = 2 \cdot \omega_v \cdot \hat{J}_0$, and to compute the initial integral gain based upon $K_{i\_v0} = \omega_v^2 \cdot \hat{J}_0$.

13. The system of claim 11, wherein said control module further includes an inertia estimating unit configured to:
deactivate the servomotor so as to make the servomotor decelerate;
sample a plurality of angular velocity values during deceleration of the servomotor; and compute an estimated inertia using curve fitting based on the angular velocity values and the estimated friction coefficient.

14. The system of claim 13, wherein said control module is further operable to:

compute an estimated torque constant $\hat{K}_t$ based upon $$\hat{K}_t = 1.5 \times \frac{v_q - i_3 \cdot r_s}{\omega_1}$$

and the estimated friction coefficient $\hat{B}$ based upon $$\hat{B} = \frac{\hat{K}_t \cdot i_3}{\omega_1}$$

when the servomotor rotates at the predetermined angular velocity, where $r_s$ is a resistance value of the servomotor, and $i_3$ is a q-axis component of the output current corresponding to the predetermined angular velocity $\omega_1$; and compute the estimated inertia $\hat{J}$ based upon $$\hat{J} = \frac{\hat{B}}{N},$$

where N is a constant associated with time solved by the curve fitting with an exponential function $\omega(t)=M \cdot e^{N \cdot t}$, and M is a constant associated with the angular velocity of the servomotor solved by the curve fitting with the exponential function.

15. The system of claim 14, wherein said control module is further operable to compute a proportional gain based upon the estimated inertia, to compute an integral gain based upon the estimated friction coefficient, and to control said rotating speed control loop with the proportional gain and the integral gain.

16. The system of claim 15, wherein said control module is operable to compute the proportional gain based upon $K_{p\_v}=\omega_v \cdot \hat{J}$, and to compute the integral gain based upon $K_{i\_v}=\omega_v \cdot \hat{B}$.

* * * * *